United States Patent [19]
Koyomogi et al.

[11] Patent Number: 5,427,357
[45] Date of Patent: Jun. 27, 1995

[54] CONTROL VALVE

[75] Inventors: Mutsunori Koyomogi; Kunihiko Daido; Masahiko Nakazawa; Yukio Minami; Masahiko Sogao; Kazuhiro Yoshikawa; Shuhei Ogawa; Tetsuya Kojima, all of Osaka, Japan

[73] Assignee: Fujikin Incorporated, Osaka, Japan

[21] Appl. No.: 209,906

[22] Filed: Mar. 14, 1994

[30] Foreign Application Priority Data

May 7, 1993 [JP] Japan ................. 5-107007
Nov. 30, 1993 [JP] Japan ................. 5-299825

[51] Int. Cl.⁶ ............................................ F16K 3/00
[52] U.S. Cl. ................................. 251/329; 137/334
[58] Field of Search .............. 251/318, 329; 137/334, 137/338

[56] References Cited

U.S. PATENT DOCUMENTS

2,209,296  7/1940  Jewell et al. ............. 137/334
2,228,849  1/1941  Sandos et al. .
3,253,611  5/1966  Cummins ................. 137/338

FOREIGN PATENT DOCUMENTS

1328428  4/1963  France .
1023942  6/1958  Germany .

Primary Examiner—John G. Fox
Attorney, Agent, or Firm—Armstrong, Westerman, Hattori, McLeland & Naughton

[57] ABSTRACT

A control valve comprises a valve body having a fluid channel and a valve seat; a valve operating part; a valve stem supporting member having its upper end fixed to the valve operating part and its lower end fixed to the valve body; a valve stem penetrating the valve stem supporting member and having its upper end part connected to the valve operating part and its lower end part entering the valve body, the valve stem being movable upward or downward by the valve operating part; and a valve element attached to the lower end of the valve stem. The valve element is moved upward or downward by moving the valve stem upward or downward, the valve element being brought into contact with and seated in the valve seat to close a fluid channel as it is moved downward, the valve element being detached from the valve seat to open the fluid channel as it is moved upward. The valve stem supporting member has an upper tubular body and a lower tubular body, the upper tubular body having its upper end fixed to the valve operating part and its lower end detached from the valve body, the lower tubular body having its lower end fixed to the valve body and its upper end detached from the valve operating part, the two tubular bodies being spaced apart each other, the lower end part of the upper tubular body and the upper end part of the lower tubular body being connected by a connecting member.

6 Claims, 4 Drawing Sheets

CONTROL VALVE

BACKGROUND OF THE INVENTION

The present invention relates to a control valve.

The terms "upward" and "downward" and like terms as used herein and in the appended claims are merely intended to express the position relation between the components of the control valve as arranged in the drawings showing the embodiment to be described below. These terms should not be interpreted as expressing the absolute "up-down" relation in the state in which the control valve is used.

The control valve comprises a valve body having a fluid channel and a valve seat; a valve operating part; a valve stem supporting member having its upper end fixed to the valve operating part and its lower end fixed to the valve body respectively; a valve stem penetrating the valve stem supporting member and having its upper end part connected to the valve operating part and its lower end part entering the valve body, the valve stem being movable upwardly or downwardly by means of the valve operating part; and a valve element attached to the lower end of the valve stem. The valve element is moved upward or downward by moving the valve stem upward or downward. The valve element is brought into contact with and seated in the valve seat to close the fluid channel as it is moved downward. The valve element is detached from the valve seat to open the fluid channel as it is moved upward.

Conventionally, this type of control valve has the valve stem supporting member formed by a single tubular body made of metal.

However, in the conventional control valve having the valve stem supporting member formed by a single tubular body made of metal, when a fluid in a low temperature or a high temperature flows through the fluid channel of the valve body, heat inflows or outflows through the valve stem supporting member between the valve operating part and the fluid, and consequently entailing a problem wherein a the fluid alters its temperature.

SUMMARY OF THE INVENTION

The object of the present invention is to solve the above mentioned problem and to provide a control valve wherein amount of heat inflowing or outflowing through the valve stem supporting member is reduced between the valve operating part and the fluid.

The control valve of the present invention comprises a valve body having a fluid channel and a valve seat; a valve operating part; a valve stem supporting member having its upper end fixed to the valve operating part and its lower end fixed to the valve body respectively; a valve stem penetrating the valve stem supporting member and having its upper end part connected to the valve operating part and its lower end part entering the valve body, the valve stem being movable upwardly or downwardly by means of the valve operating part; and a valve element attached to the lower end of the valve stem. The valve element is moved upward or downward by moving the valve stem upward or downward. The valve element is brought into contact with and seated in the valve seat to close the fluid channel as it is moved downward. The valve element is detached from the valve seat to open the fluid channel as it is moved upward. The valve stem supporting member is provided with an upper tubular body and a lower tubular body, the upper tubular body having its upper end fixed to the valve operating part and its lower end separated from the valve body, the lower tubular body having its lower end fixed to the valve body and its upper end separated from the valve operating part. The two tubular bodies are fitted to be spaced apart each other. The lower end part of the upper tubular body and the upper end part of the lower tubular body are connected by a connecting member.

In the control valve of the present invention, a path of heat transmitted through the valve stem supporting member becomes longer in comparison with the conventional valve stem supporting member. Therefore, the amount of heat transmitted through the valve stem supporting member is reduced between the fluid and the valve operating part. Consequently, even when fluid in a low temperature or fluid in a high temperature flows through the fluid channel of the valve body, the fluid is restrained from altering its temperature. Further, in contrast with the conventional member, the path of heat transmitted through the valve stem supporting member can be made longer without extending the length of the valve stem supporting member itself. Therefore, it becomes possible to miniaturize the control valve in total.

The control valve of the present invention has a swing prevention member for preventing a free end of the tubular body from swinging, the tubular body being either the upper tubular body or the lower tubular body whichever disposed outside. In this case, prevented from swinging is a free end of either the upper tubular body or the lower tubular body whichever disposed outside. Consequently, prevented is an increase in the amount of heat transmission caused by the connecting member touching one of the tubular bodies to shorten the path of heat transmission. Moreover, in order to prevent the tubular body from swinging, there is no need of increasing wall thickness of either the upper tubular body or the lower tubular body whichever disposed outside. Therefore, prevented is an increase in the amount of heat transmission caused by thickening the wall thickness. Thus, the fluid flowing through the fluid channel of the valve body is restrained from altering its temperature. Further, a core of the valve stem supporting member is prevented from being disaligned with a core of the valve stem. Consequently, the valve stem is always moved smoothly.

The present invention will be described in more details with reference to the accompanying drawings.

DESCRIPTION OF THE PREFERRED EMBODIMENT

Figure 1:
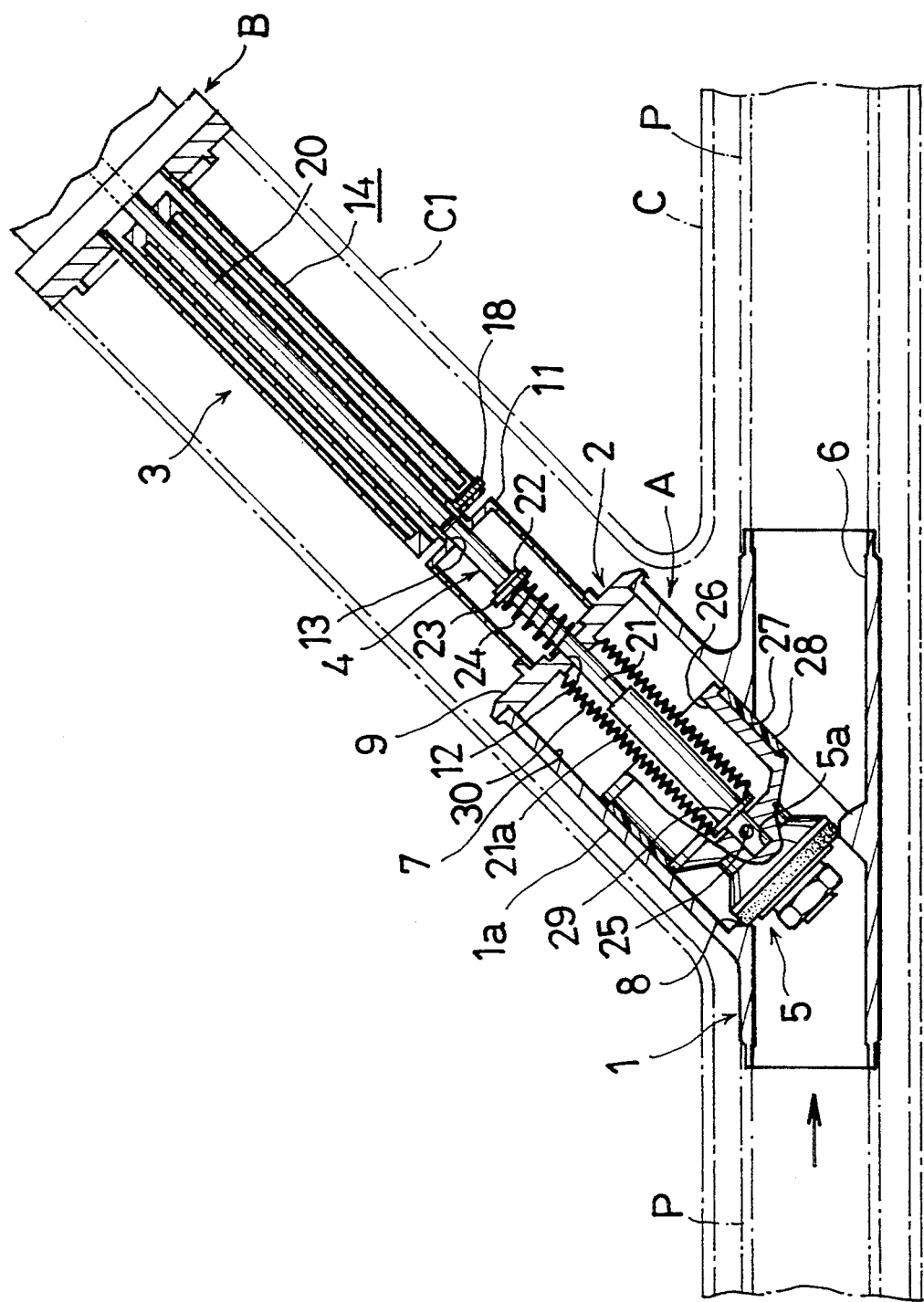
FIG. 1 is a view in vertical section showing the overall construction when the valve element of the control valve of the present invention is in a fully closed state.
Figure 2:
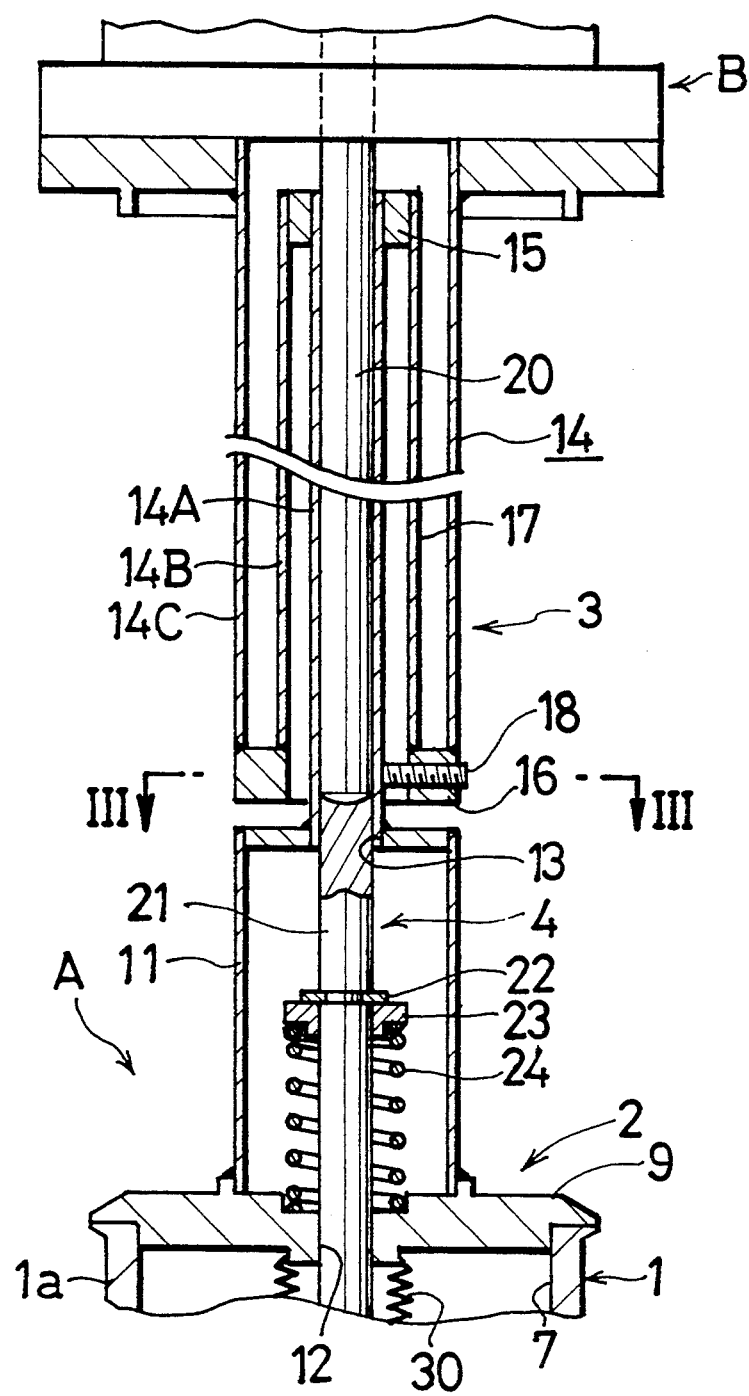
FIG. 2 is a partially enlarged view omitting a part of FIG. 1.
Figure 3:
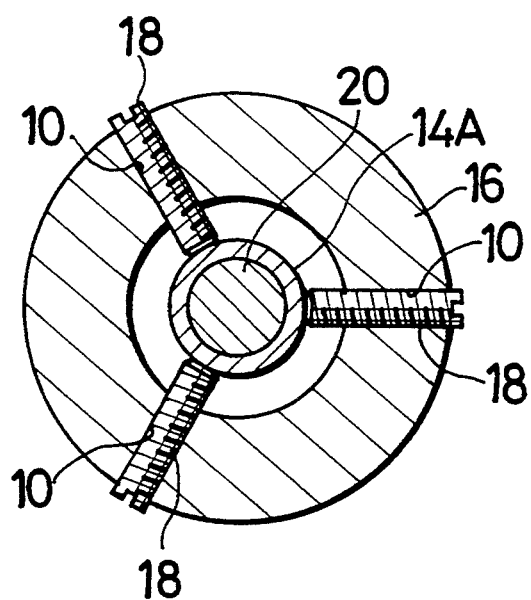
FIG. 3 is an enlarged sectional view along line X—X of FIG. 2.
Figure 4:
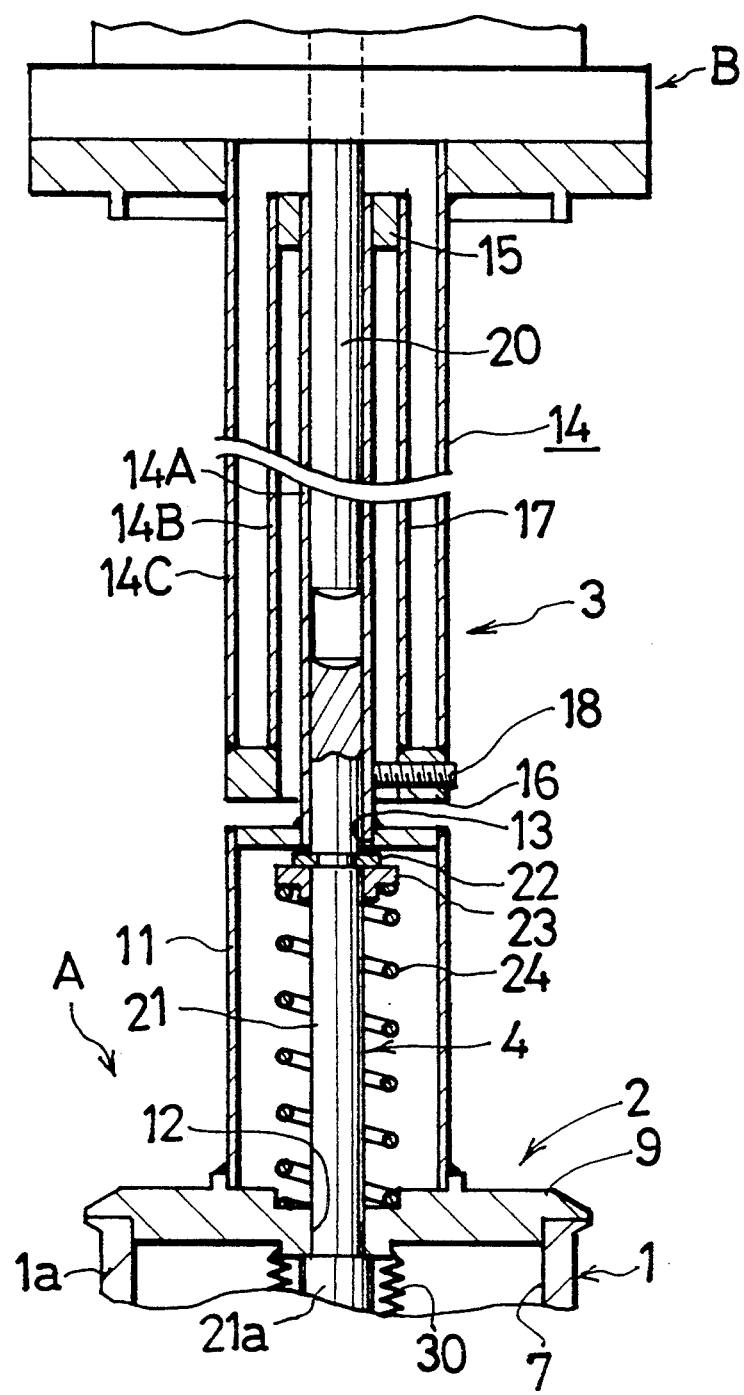
FIG. 4 is a view corresponding to FIG. 2 when the valve element is in a fully open state.

FIG. 1 shows the overall construction of a control valve, and FIG. 2–FIG. 4 show the main portion of the same in greater detail.

In FIG. 1, the control valve comprises a valve body (A), a valve operating part (B), a valve stem supporting member (3) having its upper end fixed to the valve operating part (B) and its lower end fixed to the valve body (A), a valve stem (4) penetrating the valve stem supporting member (3) and having its upper end part connected to the valve operating part (B) and its lower end part entering the valve body (A), and a valve element (5) attached to the lower end of the valve stem (4).

The valve body (A) comprises a valve case (1) and a valve closure (2) which is fixed to the valve case (1). The valve case (1) is provided with a fluid channel (6) extending from one side to the other side thereof. A fluid pipe (P) is connected to each side of the valve case (1). The fluid pipe (P) is covered with a heat insulating cover (C). The valve case (1) has an inclined cylindrical part (1a) being integrally formed and projecting upward, the cylindrical part (1a) having a valve stem bore (7) extending longitudinally from an upper end face thereof, the lower end part of the bore (7) being open to the fluid channel (6). The valve case (1) is formed with an inclined valve seat (8) facing upward and extending from an upper wall to a lower wall thereof.

The valve closure (2) is fixed to the upper end of the cylindrical part (1a) of the valve case (1). The valve closure (2) comprises a disk-like part (9) closing the upper end opening of the valve stem bore (7) and an inclined cylinder-like part (11) extending upward, the cylinder-like part (11) having a closed upper end and an open lower end, the circumferential part of the open lower end being fixed to the upper face of the disk-like part (9). The disk-like part (9) is provided with a valve stem Guide hole (12) in its center. The closed upper end wall of the cylinder-like part (11) is provided with a through hole (13) in its center.

As shown in FIG. 2, the valve stem supporting member (3) consists of a triple tube (14) made of metal. Three tubes (14A), (14B), (14C) composing the triple tube (14) are spaced apart one another. The lower end of an innermost tube (14A) (lower tubular body) among the three tubes (14A), (14B), (14C) is inserted into the through hole (13) in the closed upper end wall of the cylinder-like part (11) of the valve closure (2) and fixed by welding. The upper end of this tube (14A) is separated from the valve operating part (B). The upper end of an outermost tube (14C) (upper tubular body) among all the tubes (14A)–(14C) composing the triple tube (14) is fixed to the valve operating part (B). The lower end of this tube (14C) is separated from the valve body (A). The upper end and the lower end of the center tube (14B) among all the tubes (14A)–(14C) composing the triple tube (14) are respectively separated from the valve operating part (B) and the valve body (A). The upper end of this tube (14B) is connected to the upper end of the innermost tube (14A) by a connecting ring (15), and the lower end of the tube (14B) is connected to the lower end of the outermost tube (14C) by a connecting ring (16). The couple of tubes (14A), (14B) and the connecting ring (15) are welded together, and so are the other couple of tubes (14B), (14C) and the connecting ring (16). Therefore, a connecting member (17) which connects the upper end of the innermost tube (14A) to the lower end of the outermost tube (14C) comprises the connecting ring (15), the center tube (14B) and the connecting ring (16).

As shown in FIG. 3, the connecting ring (16) disposed on the lower side has a plurality of tapped holes, e.g., 3 (three) tapped holes (10) penetrating the ring (16) radially, the holes (10) being circumferentially spaced apart one another. The number of tapped holes (10) is not limited to 3 (three). A plastic male screw (18) for preventing swing (a swing prevention member) is screwed in each hole (10) from outside, and the front end of the screw (18) is abutted on the innermost tube (14A). The male screw (18) for preventing swing is not limited to a plastic made.

The valve closure (2) and the valve stem supporting member (3) are surrounded by a cylindrical part (C1) provided on the heat insulating cover (C).

The valve stem (4) comprises an upper bar-shaped member (20) made of metal and a lower bar-shaped member (21) made of fiber reinforced plastic. Incidentally, the lower bar-shaped member (21) is not limited to a fiber reinforced plastic made, but it may be made of other plastic or metal. The upper bar-shaped member (20) has its upper end connected to the valve operating part (B) and its lower end slidably inserted into the innermost tube (14A), the member (20) being made movable upwardly or downwardly by the valve operating part (B). The lower bar-shaped member (21) slidably penetrates the valve stem guide hole (12), the upper end thereof being slidably inserted into the innermost tube (14A) and movable upwardly or downwardly. Therefore, the lower bar-shaped member (21) is pushed by the upper bar-shaped member (20) and moved downward when the upper bar-shaped member (20) is moved downward.

As shown in FIG. 2, a retaining ring (22) is fixed to the lower bar-shaped member (21) inside the cylinder-like part (11) of the valve closure (2), and a spring seat (23) is upwardly or downwardly movably fitted around a portion of the lower bar-shaped member (21) below the retaining ring (22). A compression coil spring (24) (an elastic member) is arranged around the lower bar-shaped member (21) between the upper face of the disk-like part (9) of the valve closure (2) and the spring seat (23). The repulsive force of the compression coil spring (24) is transmitted to the lower bar-shaped member through the spring seat (23) and the retaining ring (22) so that the lower bar-shaped member (21) is always urged upward. Consequently, the lower bar-shaped member (21) is raised by the repulsive force of the compression coil spring (24) when the upper bar-shaped member (20) is raised.

The lower bar-shaped member (21) is provided with a large diameter part (21a) of a prescribed length inside the valve stem bore (7) of the cylindrical part (1a) of the valve case (1). A portion of the lower bar-shaped member (21) below the large diameter part (21a) is fitted in a hole (5a) provided on the upper face of the valve element (5), the portion being fixed to the valve element (5) by a pin (25). Then, the lower bar-shaped member (21) is adapted to move upwardly or downwardly within a prescribed distance between a lower end position and an upper end position, the lower end position being a position where the valve element (5) is brought into contact with and seated in the valve seat (8) to be in a fully closed state, the upper end position being a position where the large diameter part (21a) is abutted on the disk-like part (9). In the upper end position, the valve element (5) is detached from the valve seat (8) to be in a fully open state.

When the lower bar-shaped member (21) is in the lower end position, the upper bar-shaped member (20) is also in the lower end position beyond which the member (20) does not descend further. The upward moving distance of the upper bar-shaped member (20) from the lower end position is made longer than the moving distance of the lower bar-shaped member (21) from the lower end position to the upper end position.

An inclined cylindrical portion (26) projecting upward is integrally formed around the circumferential part of the valve element (5). A shallow circular groove (27) is provided on an outer circumferential surface of the cylindrical portion (26). A cylindrical plastic guide (28) is fitted in this circular groove (27), the guide (28) being made of a synthetic resin, for example, a fluorinated resin, the guide (28) being slidable along an inner circumferential surface of the cylindrical part (1a) of the valve case (1). A ring (29) is fixedly fitted around the upper end of a portion projecting upward from the hole (5a) disposed below the large-diameter part (21a) of the lower bar-shaped member (21). The upper and lower ends of the bellows (30) are tightly fixed to the disk-like part (9) of the valve closure (2) and the ring (29) respectively so that the bellows (30) hermetically seal a space therebetween.

When the upper bar-shaped member (20) of the valve stem (4) is moved downward by the valve operating part (B), the lower bar-shaped member (21) and the valve element (5) are pushed by the upper bar-shaped member (20) to move downward against the repulsive force of the compression coil spring (24). The valve element (5) is brought into contact with and seated in the valve seat (8) to close the fluid channel (6) as it is moved downward. In the fully closed state of the valve element (5), the upper end surface of the lower bar-shaped member (21) and the lower end surface of the upper bar-shaped member (20) are abutted each other. The amount of heat transmitted through the valve stem (4) is reduced between the fluid inside the fluid channel (6) and the valve operating part (B) by means of the lower bar-shaped member (21) made of fiber reinforced plastic. In addition, the path of heat transmitted through the valve stem supporting member (3) becomes long since the supporting member (3) comprises a triple tube (14) made of metal, the innermost tube (14A) having its lower end fixed to the valve closure (2)and its upper end separated from the valve operating part (B), the outermost tube (14C) having its upper end fixed to the valve operating part (B) and its lower end separated from the valve body (A), the upper end of the innermost tube (14A) and the lower end of the outermost tube (14C) being connected the connecting member (17). Consequently, the amount of heat transmitted through the valve stem supporting member (3) is reduced between the fluid inside the fluid channel (6) and the valve operating part (B). Moreover, the male screw (18) prevents the lower end of the outermost tube (14) from swinging, and thereby the lower end of the center tube (14B) is prevented from touching the lower end of the innermost tube (14A). As a result, the path of heat transmission is prevented from becoming short.

When the upper bar-shaped member (20) of the valve stem (4) is moved upward by the valve operating part (B), the lower bar-shaped member (21) and the valve element (5) are moved upward by the repulsive force of the compression coil spring (24). The valve element (5) is detached from the valve seat (8) to open the fluid channel (6) as it is moved upward. When the lower bar-shaped member (21) is moved upward and the valve element (5) is in the fully opened state, the upper end of the large diameter part (21a) of the lower bar-shaped member (21) comes abutted on the disk-like member (9), the lower bar-shaped member (21) having reached the upper end position, the lower bar-shaped member (21) and the valve element (5) being stopped at this position. Subsequently, the upper bar-shaped member (20) is moved further upward by the valve operating part (B) so as to be detached from the lower bar-shaped member (21) (See FIG. 4). Thus, when the control valve is fully opened, the heat is prevented from flowing through the valve stem (4) between the fluid in the fluid channel (6) and the valve operating part (B). Further, similarly to the above-mentioned fully closed state, the amount of heat transmitted through the valve stem supporting member (3) is also reduced between the fluid in the fluid channel (6) and the valve operating part (B) in this fully opened state. Furthermore, since the the lower end of the outermost tube (14C) is prevented from swinging by means of the male screw (18), the core of the valve stem supporting member (3) is prevented from being disaligned with the core of the valve stem (4). As a result, the valve stem (4) is always moved smoothly.

Incidentally, in the above case, the valve supporting member (3) has the tube (14C) being arranged on the outermost side, the tube (14C) having its upper end fixed to the valve operating part (B) and its lower end separated from the valve body (A), the male screw (18) being provided to prevent the lower end of the tube (14C) from swinging. However, in contrast with this, the tube (14A) can be arranged on the outermost side, the tube (14A) having its lower end fixed to the valve body (A) and its upper end separated from the valve operating part (B), the male screw (18) being provided to prevent the upper end of this tube (14A) from swinging.

What is claimed is:

1. A control valve comprising:
    a valve body having a fluid channel and a valve seat;
    a valve operating part;
    a valve stem supporting member having its upper end fixed to the valve operating part and its lower end fixed to the valve body;
    a valve stem penetrating the valve stem supporting member and having its upper end part connected to the valve operating part and its lower end part entering the valve body, the valve stem being moved upward or downward by the valve operating part; and
    a valve element attached to the lower end of the valve stem;
    the valve element being moved upward or downward by moving the valve stem upward or downward, the valve element being brought into contact with and seated in the valve seat to close the fluid channel as the element is moved downward, the valve element being detached from the valve seat to open the fluid channel as the element is moved upward,
    chracterized in that the valve stem supporting member has an upper tubular body and a lower tubular body, the upper tubular body having its upper end fixed to the valve operating part and its lower end separated from the valve body, the lower tubular body having its lower end fixed to the valve body and its upper end separated from the valve operating part, the two tubular bodies being fitted to be spaced apart each other, the lower end part of the upper tubular body and the upper end part of the lower tubular body being connected by a connecting member.

2. A control valve as defined in claim 1, wherein at least a portion of the total length of the valve stem is made of plastic.

3. A control valve as defined in claim 1, further comprising a swing prevention member which prevents a free end of the tubular body from swinging, the tubular body being either the upper tubular body or the lower tubular body whichever disposed outside.

4. A control valve as defined in claim 1, wherein the upper tubular body is disposed outside the lower tubular body, a third tubular body being arranged between the upper tubular body and the lower tubular body and spaced apart from each of the bodies, the third tubular body being arranged so that its upper and lower ends are respectively separated from the valve operating part and the valve body, the lower end of the upper tubular body and the lower end of the third tubular body being connected by a connecting ring, the upper end of the lower tubular body and the upper end of the third tubular body being connected by the other connecting ring, a connecting member being provided with the two connecting rings and the third tubular body.

5. A control valve as defined in claim 4, wherein the connecting ring for connecting the lower end of the upper tubular body to the lower end of the third tubular body has a plurality of tapped holes radially penetrating the ring and being circumferentially spaced apart one another, a male screw for preventing swing being screwed in each tapped hole from outside, the front end of the screw being abutted on the lower tubular body.

6. A control valve as defined in claim 5, wherein the male screw for preventing swing is made of plastic.

* * * * *